United States Patent [19]

Watts

[11] 4,310,041

[45] Jan. 12, 1982

[54] TIRE WITH SIDEWALL PROTECTOR

[75] Inventor: George T. Watts, North Canton, Ohio

[73] Assignee: The Goodyear Tire & Rubber Company, Akron, Ohio

[21] Appl. No.: 15,492

[22] Filed: Feb. 26, 1979

[51] Int. Cl.$^3$ .................. B60C 27/00; B60C 27/06; B60C 13/00

[52] U.S. Cl. .................. 152/187; 152/179; 152/185.1; 152/191; 305/54

[58] Field of Search .............. 152/187, 159, 170, 175, 152/188, 189, 185, 185.1, 178, 179, 180, 182, 190, 191, 160; 305/19, 51, 54; 301/37 R, 37 ST

[56] References Cited

U.S. PATENT DOCUMENTS

| | | | |
|---|---|---|---|
| 3,815,651 | 6/1974 | Neal | 152/187 |
| 4,030,530 | 6/1977 | Curtiss, Jr. | 152/187 |
| 4,111,250 | 9/1978 | Bayer | 152/179 X |

FOREIGN PATENT DOCUMENTS 7981 2/1980 European Pat. Off. ...

Primary Examiner—John E. Kittle
Assistant Examiner—Thomas Bokan
Attorney, Agent, or Firm—D. M. Ronyak

[57] ABSTRACT

A detachable, resilient shield is maintained in contact with the sidewalls of a tire for off-the-road vehicles to protect this critical area of the tire from damage due to contact with external objects such as rocks. The tire includes a removable tread or a lug traction band. The shield is manufactured separately from the tire. The shield includes criss-crossed reinforcements which extend at oppositely directed angles greater than zero but less than ninety degrees relative to the circumferential direction of the tire.

8 Claims, 3 Drawing Figures

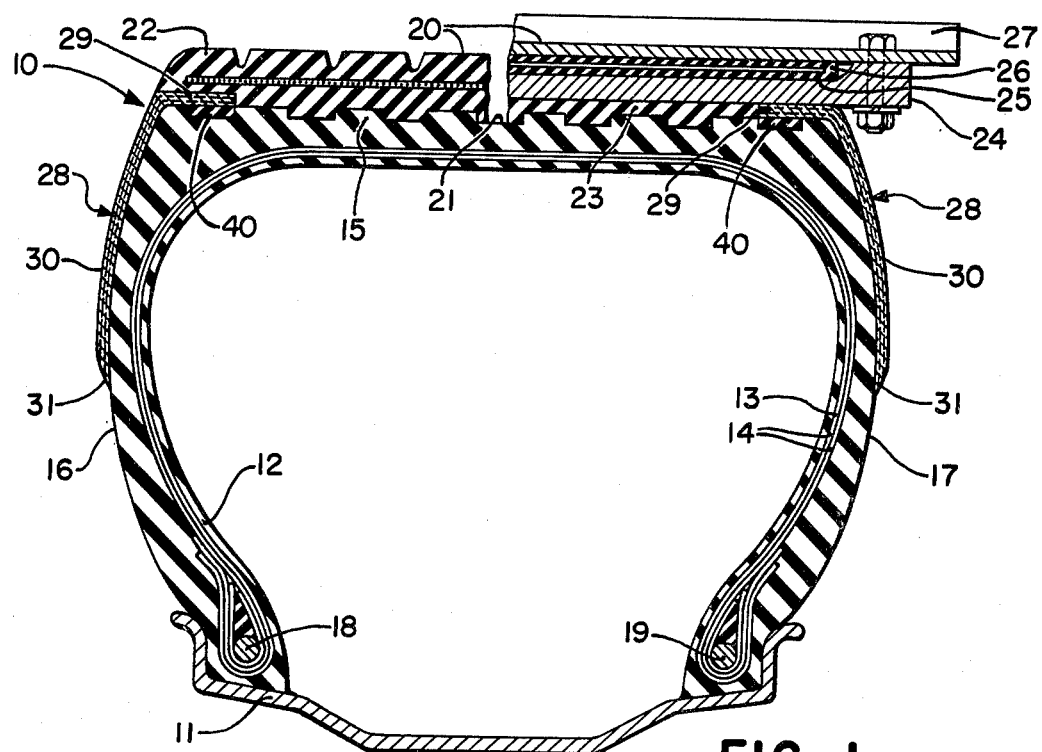
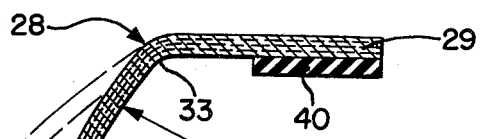
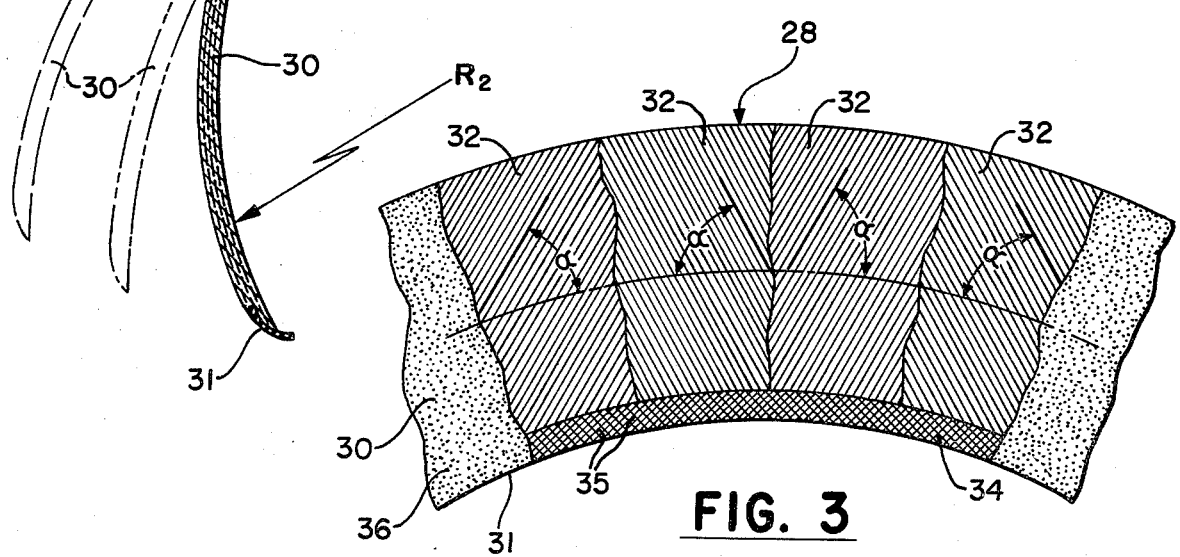

TIRE WITH SIDEWALL PROTECTOR

BACKGROUND OF THE INVENTION

The foregoing abstract is not to be taken as limiting the invention of this application and in order to understand the full nature and extent of the technical disclosure of this application reference must be made to the accompanying drawings and the following detailed description.

The invention relates to protection of the sidewalls of vehicle tires which operate off the road and especially those tires which employ a removable tread or a detachable traction band having grouser bars. In such tires the sidewalls are vulnerable to damage from sharply pointed rocks and other material which the tire is likely to encounter as it rolls over the rough terrain for which off-the-road type vehicles are designed to operate.

There has been a continuing effort to provide protection for the protruding flexed sidewalls of the tires without detracting from the design characteristics of the tire. Passenger tires of the early 1900s were highly susceptible to punctures. Curved metal protector plates have been used with little success to shield the sidewalls of the tire. Non-metallic shields have also been used to protect tire sidewalls. Resilient annular shields for protecting the sidewalls of the tire composed of a suitable resilient material such as rubber have been employed wherein the shileds are attached to the tire such that portions of the shields covering the sidewalls are free of the sidewalls so that stress as experienced by the tire sidewalls as they flex during operation of the tire will not be imparted to the shields.

None of the prior art tire sidewall shields have been entirely satisfactory for use with tires intended for off-the-road operation. Prior art shields have not been as effective as desired in excluding dirt, sand and other debris from ingress between the outer surface of the tire sidewall and the inner surface of the sidewall shield. Accumulation of debris in this area results in damage to the tire sidewall during continued operation of the tire.

A primary object of the invention is to provide a replaceable reinforced annular resilient shield for protection of the sidewall of a tire, the reinforcements assisting in maintaining firm engagement of the shield with the adjacent sidewall of the tire.

A further object of the invention is to provide a tire including a resilient shield for protection of the sidewall of a tire, the shield including reinforcements which assist the shield, and particularly its radially innermost end, in maintaining firm engagement with the tire sidewall during operation of the tire to reduce entry of debris between the shield and the tire sidewall.

These and other objects and advantages of the invention will become apparent as the description proceeds.

SUMMARY OF THE INVENTION

A resilient annular shield is provided for protecting the sidewall of a tire. The shield is generally L-shaped in radial cross section, and includes a cylindrical portion and an annular sidewall-covering portion extending radially inwardly from one axial end of the cylindrical portion. The cylindrical portion is manufactured of less diameter than that of the inflated tire carcass for which the shield is designed. The annular portion is manufactured of a smaller radius in radial cross-section than that of the sidewall of the tire carcass for which the shield is designed. The shield is sized and configured such that when it is installed on the tire carcass for which it is designed it is in compressive engagement with the adjacent sidewall portion of the tire carcass when the tire carcass is inflated, whether the tire is loaded or unloaded. When the annular shield is attached to the tire at least the radially innermost end of the annular portion is in firm contact with the sidewall. The annular portion is in tension to provide an interference fit between the shield and the tire sidewall. The cylindrical portion may include means for forming a mechanical interlock with at least one of the components between which it is secured. The shield is composed of a suitable non-rigid, resilient material, for example rubber, and includes criss-crossing reinforcements running at oppositely directed angles which are greater than zero but less than 90 degrees relative to the circumferential direction of the shield.

BRIEF DESCRIPTION OF THE DRAWING

The description of the invention will be better understood by having reference to the annexed drawings in which:

FIG. 1 illustrates a section of a tire and wheel rim showing two different embodiments of a replaceable traction element with a shield for protecting one or both sidewalls of the tire;

FIG. 2 illustrates in radial cross section the configuration of a tire sidewall shield according to the invention in its manufactured configuration by solid lines, the configuration of its annular sidewall-covering portion when installed on a tire which is subsequently inflated but unloaded being shown schematically by chain dot lines, and the configuration of its annular sidewall-covering portion when the inflated tire is loaded being schematically shown by dashed lines;

FIG. 3 is a fragmentary side view of a preferred embodiment of a shield according to the invention with a portion being cut away to show the arrangement of the reinforcements.

ENVIRONMENT OF THE INVENTION

Referring to FIG. 1, there is shown a tire 10 and conventional drop center rim 11 on which tire 10 is mounted. The tire 10 is a large off-the-road type which may be of closed torus or oval design. The tire 10 comprises a fluid impervious innerliner 12 which is surrouned by a carcass 13 that includes an appropriate number of individual plies of rubberized reinforcement cords 14, depending on the size of the tire 10. An undertread 15 and a pair of sidewalls 16, 17 cover the tire carcass 13 and terminate at a pair of inextensible annular beads 18,19. A traction element 20 is removably mounted around the outer periphery 21 of the tire 10. The traction element 20 as seen in the left side of the drawing is a removable elastomeric tread 22 which is removably mounted around the outer periphery 21 of the tire 10. The alternate traction element 20 as seen in the right side of the drawing includes a continuous rubber tread band 23 surrounded by an articulated metal ring 24 which is provided with a circumferential recess 25 for receiving a reinforced rubber belt 26. A plurality of grouser bars 27 are fastened to the metal ring 24. The invention is designed to be used with either component of a removable tread or a tread band with attached grouser bars.

DETAILED DESCRIPTION OF THE INVENTION

Referring to FIG. 1, an annular resilient shield 28 of generally L-shaped radial cross-sectional configuration is attached to the tire 10 adjacent the removable traction element 20. A radially outermost generally cylindrical portion 29 of the shield is interposed between the removable traction element 20 and the outer peripheral surface 21 of the tire 10. A number of circumferentially oriented, matingly configured ribs and grooves are formed in the adjoining surfaces of the tire 10, traction element 20, and cylindrical portion 29 of the shield 28, to provide a mechanical innerlock between these components. From the axially outermost end of the cylindrical portion 29 an annular sidewall-covering portion 30 of the shield extends radially inwardly from the removable traction element 20 in the direction of the annular bead 18,19. As best shown in FIG. 3, the shield 28 is composed of any suitable resilient elastic material, for example, natural or synthetic rubber, or a plastic, such as urethane, and includes criss-crossing reinforcements 32 running at oppositely directed angles ($\alpha$) relative to the circumferential direction of the shield. The angles ($\alpha$) of the reinforcements 32 are greater than zero but less than 90 degrees relative to the circumferential direction of the shield. The angles are preferably about equal in magnitude relative to the circumferential direction of the shield but may be unequal. The angle of the reinforcements near the radially outermost portion of the shield are preferably from about 30 to 65 degrees relative to the circumferential direction of the shield, and most preferably at about 37 degrees relative to the circumferential direction of the shield. The reinforcements are preferably at least two layers of cord fabric. Cord fabric as used herein is a fabric in which the strength is in the warp cords 32 and the filling cords (not shown) serve only to hold the warp cords in position for processing. The filling cords do not provide any substantial reinforcement of the completed shield. As used herein, cord fabric is to be distinguished from square woven fabric in which the warp and filling yarns or cords criss-cross and in which both the warp and filling yarns or cords are of substantial strength and contribute to reinforcement of the completed article. The shield may include an outer cover 36 of abrasion-resistant elastic material.

The radially innermost free end 31 of the annular sidewall-covering portion 30 of the resilient shield 28 preferably extends radially inwardly of the most laterally flexed or deflected portion of the sidewall 16 or 17 (see position of the annular portion 30 as displaced by sidewall 16 in loaded area as shown by dashed line in FIG. 2) when tire 10 is in operation on the vehicle for which tire 10 is designed. The annular portion 30 of the resilient shield 28 which covers at least an upper sidewall of the tire 10 has an undeformed configuration as manufactured (see FIG. 2) such that when installed on the tire 10 for which it is designed and the tire 10 is inflated the shield 28 is distended by the tire sidewall 16 or 17. This configuration is shown in FIG. 2 in solid lines and will be fully explained later herein. As a result of this distension the cord reinforcements 32 of the shield 28 are displaced from their as-manufactured undeformed configuration. Displacement of these reinforcements is believed to create counteracting forces in the shield 28 directed toward its undeformed configuration. Thus, the shield 28, and particularly its radially innermost end 31, is caused to be in firm compressive engagement with the adjacent tire sidewall 16 or 17 to reduce or prevent ingress of dirt, sand, rocks and other debris between the shield 28 and the portion of the tire sidewall 16 or 17 which is covered by the shield.

Referring to FIG. 2 it can be seen that the free end 31 of the shield 28 is further displaced from its undeformed configuration (illustrated in solid lines) in the deflected portion of the tire sidewall (illustrated by dashed lines) in comparison with its configuration when installed on an unloaded tire (illustrated by chain dot lines). In the deflected portion of the tire sidewall the reinforcements 32 of the shield 28 are even further displaced from their as-manufactured equilibrium configuration and, are believed to correspondingly cause the annular portion 30 to exert an even greater force on the tire sidewall 16 or 17 to reduce or prevent ingress of debris between the protective shield 28 and the adjacent tire sidewall. Thus, it is seen that the shield 28 continuously is in contact with the upper sidewall and is designed so at least its radially innermost free end 31 will compressively engage the upper sidewall of the tire which the shield at least partially covers to prevent dirt and other debris from ingress between the shield and the sidewall 16 or 17 of the tire 10.

Referring to FIG. 2, the shield 28 as manufactured is of a lesser overall diameter than that of the tire 10 for which it is designed. The annular sidewall-covering portion 30 of the shield 28 which covers at least the radially outermost flexed portions of the sidewall 16 or 17 during operation of the tire 10, as manufactured, is configured such that it will compressively engage the sidewalls of the tire 10 for which it is designed when installed on the tire. The annular sidewall-covering portion 30 of the shield 28 is arcuately configured when viewed in a radial cross-section of the shield and is curved in the same direction as the sidewall 16 or 17 of the tire 10. Preferably, the radius of curvature as measured in the transverse direction of the shield of the annular sidewall-covering portion 30 near the junction 33 of the sidewall-covering portion 30 and the cylindrical portion 29 ($R_1$) approximates that of the corresponding portion of the inflated tire sidewall. Preferably, the radius of curvature as measured in the transverse direction of the shield of the sidewall-covering portion 30 becomes progressively less than that of the corresponding portion of the inflated tire sidewall toward the radially innermost end 31 of the shield. Referring to FIG. 2, the radius of transverse curvature $R_2$ near the radially innermost end 31 is smaller than $R_1$. Such configuration is believed to increase the force with which the radiallyinnermost end 31 engages the tire sidewall.

The directions of the reinforcements 32 of the annular sidewall-covering portion 30 of the shield which covers at least the radially outermost flexed portions of the tire sidewall 16 or 17 are shown in FIG. 3. In a preferred embodiment as shown the annular sidewall-covering portion 30 of the shield 28 includes four plies of elastomer-coated cord fabric (1260 denier nylon, 3 ply cord, 7.5 cords/centimeter of fabric width as measured perpendicular to the longitudinal direction of the cords) with the cords of the adjacent layers criss-crossing one another. The cords 32 of the adjacent layers are oppositely but equally directed with respect to a given circumference of the shield 28. The cords form an angle of about 45 degrees with respect to the longitudinal direction of the ply before the ply is brought into the configuration of the shield. It is believed that a pantographing action of these adjacent layers of oppositely directed cords 32 occurs during installation and operation of the shield and tire which maintains the shield in positive engagement with the adjacent tire sidewall. Although four layers of elastomer-coated cord fabric are shown, additional layers may be employed with the cords of each layer being oppositely directed to those of the adjacent layers. Two layers of cord fabric may be employed as a minimal construction.

Engagement of the radially innermost end 31 of the resilient shield 28 with the adjacent flexing portion of the tire sidewall 16 or 17 covered thereby may be further improved by provision of a strip 34 of elastomer-coated square woven fabric adjacent the radially innermost free end 31 of the resilient shield 28. The criss-crossing cords 35 of the square woven fabric are directed in two principle directions relative to the circumferential direction of the shield and form angles greater than zero degrees but less than 90 degrees relative to the circumferential direction of the shield, and preferably between about 30 and 65 degrees relative to the circumferential direction of the shield. In a preferred embodiment shown in FIG. 3 the cords form angles of about 45 degrees with respect to the longitudinal direction of the strip prior to its being applied adjacent to the radially inner free end 31 of the shield 28. A cover 36 of elastomer material overlies the reinforcement layers. Preferably the elastomer material of cover 36 is of high abrasion and cut resistance.

The shield 28 is separately manufactured from the tire for which it is designed. The shield is not cemented or vulcanized to the sidewall 16 or 17 of the tire 10. A severely worn and/or damaged shield can be easily removed and replaced with a new one. It is essential that the shield 28 be a continuous annulus to gain the maximum engagement force with the adjacent tire sidewall 16 or 17 from the reinforcements within the shield.

One method of manufacture of the sidewall protection shield of this invention includes use of a mandrel having a profile corresponding to that of the as-manufactured configuration of the sidewall protector shown in FIG. 2. In a preferred embodiment, a first two-ply band of rubberized cord fabric is prepared the cords of which are criss-crossed and extend at oppositely directed angles between about 35 and 70 degrees relative to the longitudinal direction of the band and most preferably, at about 45 degrees relative to the longitudinal direction of the band. The circumference of the band is less than that of the cylindrical portion of the mandrel, preferably by about 10 to 20 percent. Elastomeric material may be applied to the inside of the band near one edge to form a tongue. This elastomeric material becomes a rib 40 for mechanical innerlock with a mating groove in the tire carcass or traction element of the tire. The two-ply band is stretched onto the building mandrel until the tongue of elastomer material snaps into the groove provided in the building mandrel. A second two-ply band of rubberized cord fabric, similar to the first band is applied over the first band on the building mandrel with its edges in alignment with those of the first band. The portions of the band axially outward from the cylindrical surface of the mandrel are forced down over the convexly curved end of the mandrel and are made to contact the curved end of the mandrel and assume its configuration. A strip of square woven fabric having criss-crossed cords, any individual cord preferably being directed from about 30 degrees to 70 degrees and most preferably, about 45 degrees to the longitudinal direction of the strip, is placed axially outwardly near the radially inner edge of the outermost band. This strip could also be placed between the bands or on the inner surface of the first band. A cover of elastomer material is placed over the strip and band to form the outer layer of the shield. The part is then cured under heat and pressure. The diameter of the cylindrical mandrel is slightly less than that of the inflated tire carcass for which the shield is designed preferably about 1 to 3 percent. This causes the shield to be tensioned upon installation and subsequent inflation of the tire carcass. The elastomeric cover 36 of the sidewall protector shield may be provided with reinforcement such as textile cords, chopped fibers or wires, to further improve resistance of the sidewall protection shield to cutting and abrasion.

If it is desired to make the shield of a resilient plastic, such as a polyurethane, the above-described procedure would, of course, be modified. The reinforcements would be positioned on the mandrel as described and illustrated herein and the resilient plastic introduced in known manner such as injection molding or rotary casting.

Thus, there has been provided a removable resilient reinforced shield which is positioned in firm engagement with the sidewall of a tire for absorbing cuts and bruises normally inflicted on a tire. The shield is a separately manufactured part of reinforced elastomeric material. The shield is in addition to the normal rubber sidewall stock of the tire. Where it is desired to protect only one sidewall of the tire a single shield can be used. It is most desirable to attach the shield to the tire adjacent the tread of the tire. The shield can be used in conjunction with protection shields (not shown) of the type which attach adjacent to the bead area of the tire for protection of the lower sidewall of the tire. The annular portion 30 of the shield can extend radially inwardly so as to cover substantially all of the exposed tire sidewall.

As used herein, a "radial cross-section" of a tire, an annular tire sidewall portion shield, or the mandrel used in the manufacture of such a shield, is a cross section taken along a radial plane of the respective article. A "radial plane" as used herein, is a plane which contains the axis of rotation of the respective tire, shield or mandrel.

"Radially inward" and related forms, as used herein, means directed toward the axis of rotation of the respective tire, shield or mandrel.

"Axial" and related forms, as used herein, means in a direction generally parallel to the axis of rotation of the respective tire, shield or mandrel.

While certain representative embodiments and details have been shown for the purpose of illustrating the invention, it will be apparent to those skilled in this art that various changes and modifications may be made therein without departing from the spirit or scope of the invention.

What is claimed is:

1. In a tire comprising components of a tire carcass, a removable traction element overlying the carcass, and a pair of sidewalls which at least partially surround the carcass; an annular non-rigid shield for covering and protecting the adjacent sidewall portion of the tire against damage from contact with external objects and for reducing entry of debris between the shield and the adjacent tire sidewall portion, the shield being separately manufactured from the tire carcass, the shield being of reinforced elastomeric material; the shield being generally L-shaped in radial cross-section and including
  (a) a cylindrical portion which is secured between the traction element and the tire carcass, the cylindrical portion being of a manufactured inside diameter less than the outside diameter of the inflated tire carcass over which it is fitted;
  (b) means carried by the cylindrical portion for forming a mechanical interlock with at least one of the two tire components between which it is secured; and
  (c) an annular sidewall-covering portion extending generally radially inwardly from one axial end of the cylindrical portion, the annular portion at least covering and engaging the adjacent upper sidewall portion of the tire, the annular portion, when viewed in radial cross-section of the undeformed shield, being arcuate and of smaller radius of curvature than the tire carcass and the adjacent sidewall portion when viewed in radial cross section of the inflated tire, the annular portion including at least two layers of elastomer-coated cord fabric, the cords of adjacent layers of which extend at oppositely directed angles relative to the circumferential direction of the shield, the angle of each of the cords of the undeformed shield near the junction of the annular portion and the cylindrical portion being from about 30 to 65 degrees relative to the circumferential direction of the shield.

2. The tire of claim 1, wherein the angle of each cord near the junction of the annular portion and the cylindrical portion is about 37 degrees relative to the circumferential direction of the tire.

3. The tire of claim 1, wherein the annular portion includes at least four layers of elastomer-coated cord fabric.

4. The tire of claim 1, wherein the cylindrical portion is of an inside diameter of about 1 to 3 percent less than the outside diameter of the inflated tire carcass.

5. The tire of claim 1 or 3, wherein the annular portion further includes a circumferentially extending reinforcing strip of elastomer-coated cord fabric adjacent the radially innermost end of the annular portion, the strip having criss-crossing cords in two principal directions, the cords of the strip each being at an angle from about 30 degrees to 65 degrees relative to the circumferential direction of the shield.

6. The tire of claim 5, wherein each cord of the strip is at an angle of about 45 degrees relative to the circumferential direction of the tire.

7. The tire of claim 1, wherein the annular portion, when viewed in radial cross-section of the undeformed shield, is arcuate and its radius of curvature as measured in a radial cross section of the shield is less near its radially innermost end than near the junction of the annular portion and the cylindrical portion.

8. In a tire comprising components of a tire carcass, a removable traction element overlying the carcass and a pair of sidewalls which at least partially surround the carcass; an annular non-rigid shield for covering and protecting an adjacent upper sidewall portion of the tire against damage from contact with external objects and for reducing entry of debris between the shield and the adjacent sidewall portions covered thereby, the shield being separately manufactured from the tire carcass; the shield being of reinforced elastomeric material; the shield being generally L-shaped in radial cross-section and including
  (a) a cylindrical portion which is secured between the traction element and the tire carcass, the cylindrical portion being of a manufactured inside diameter of about 1 to 3 percent less than the outside diameter of the inflated tire carcass over which it is fitted;
  (b) means carried by the cylindrical portion for forming a mechanical interlock with at least one of the two tire components between which it is secured; and
  (c) an annular sidewall-covering portion extending generally radially inwardly from one axial end of the cylindrical portion, the annular portion at least covering and engaging the adjacent upper sidewall portion of the tire, the annular portion, when viewed in radial cross section of the undeformed shield, being arcuate and of smaller radius of curvature than the adjacent sidewall portion when viewed in radial cross section of the inflated tire, the radius of curvature of the annular portion as measured in a radial cross section of the undeformed shield being less near its radially innermost end than near the junction of the annular portion and the cylindrical portion, the annular portion including at least four layers of elastomer-coated cord fabric, the cords of adjacent layers of which extend at oppositely directed angles relative to the circumferential direction of the tire, the angle of each of the cords of the undeformed shield near the junction of the annular portion and the cylindrical portion being from about 30 to 65 degrees relative to the circumferential direction of the tire, the annular portion having a circumferentially extending reinforcing strip of elastomer-coated square woven cord fabric adjacent the radially innermost end of the annular portion, the strip having criss-crossing cords in two principal directions, the cords of the strip each being at an angle of about 30 to 65 degrees relative to the circumferential direction of the tire.

* * * * *